United States Patent

Soles et al.

(10) Patent No.: US 9,174,507 B2
(45) Date of Patent: Nov. 3, 2015

(54) LEAF SPRING ASSEMBLY

(71) Applicant: GM GLOBAL TECHNOLOGY OPERATIONS LLC, Detroit, MI (US)

(72) Inventors: Peter J. Soles, Tecumseh (CA); Jian Chen, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 33 days.

(21) Appl. No.: 14/087,420

(22) Filed: Nov. 22, 2013

(65) Prior Publication Data

US 2015/0145187 A1 May 28, 2015

(51) Int. Cl.
*B60G 11/08* (2006.01)
*B60G 11/42* (2006.01)
*B60G 11/04* (2006.01)

(52) U.S. Cl.
CPC ............... *B60G 11/42* (2013.01); *B60G 11/04* (2013.01); *B60G 2202/112* (2013.01); *B60G 2202/143* (2013.01); *B60G 2204/121* (2013.01); *B60G 2204/125* (2013.01); *B60G 2204/45* (2013.01); *B60G 2204/4502* (2013.01)

(58) Field of Classification Search
USPC ............ 267/36.1, 40, 46, 47, 52; 280/124.17, 280/124.175
See application file for complete search history.

(56) References Cited

U.S. PATENT DOCUMENTS

| | | | | |
|---|---|---|---|---|
| 2,861,798 | A * | 11/1958 | Lenet et al. | 267/45 |
| 4,750,718 | A * | 6/1988 | Nickel | 267/49 |
| 4,802,659 | A * | 2/1989 | Hope | 267/149 |
| 4,988,080 | A * | 1/1991 | Shah | 267/30 |
| 8,950,766 | B2 * | 2/2015 | Schonen et al. | 280/124.175 |
| 2006/0061021 | A1 * | 3/2006 | Dittmar | 267/47 |
| 2012/0153594 | A1 * | 6/2012 | Heimann et al. | 280/124.175 |
| 2012/0161411 | A1 * | 6/2012 | Ehrlich et al. | 280/124.17 |

* cited by examiner

*Primary Examiner* — Christopher Schwartz
(74) *Attorney, Agent, or Firm* — Quinn Law Group, PLLC

(57) ABSTRACT

A leaf spring assembly, which may be attached to, for example, an axle or suspended components a vehicle, includes a leaf having a first end and a second end on opposing sides of a center point. The leaf is the only leaf in the leaf spring assembly. The leaf spring assembly also includes a first bumper and a second bumper spaced from the first bumper. The first bumper contacts the leaf upon a first displacement of the leaf spring assembly. The second bumper also contacts the leaf upon the first displacement of the leaf spring assembly.

14 Claims, 2 Drawing Sheets

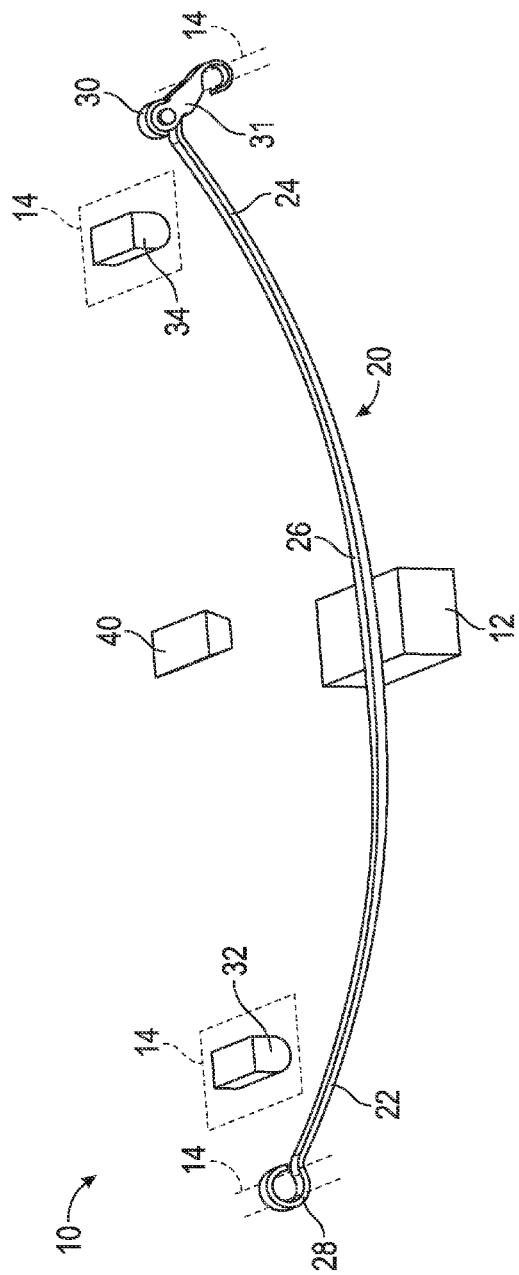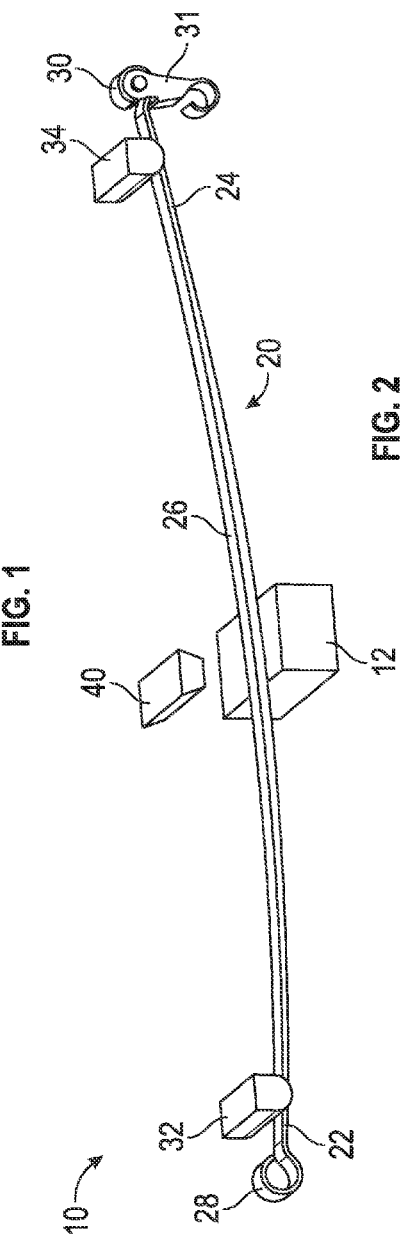

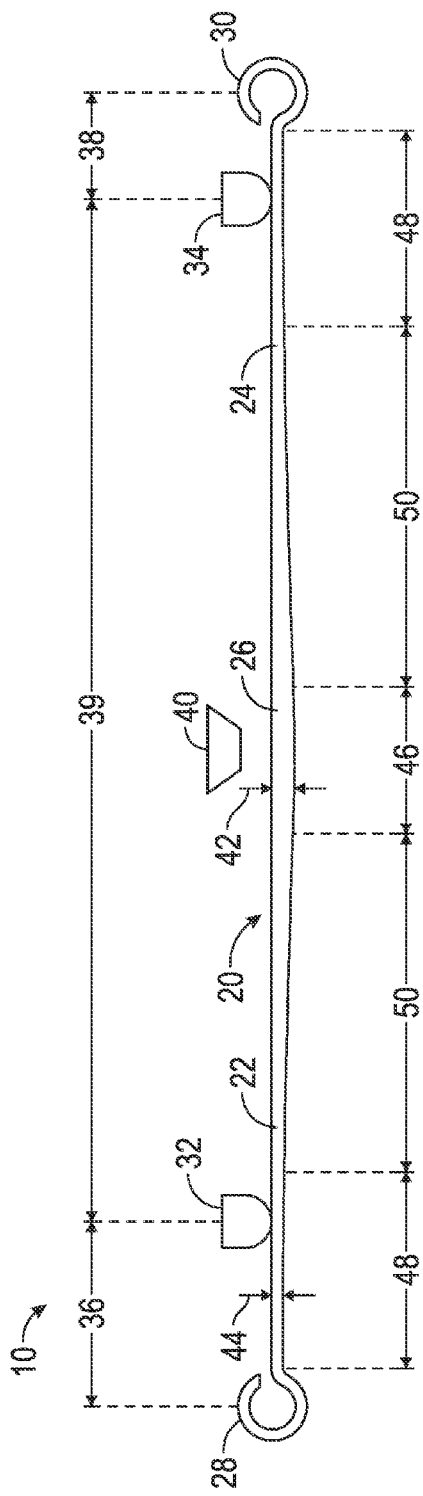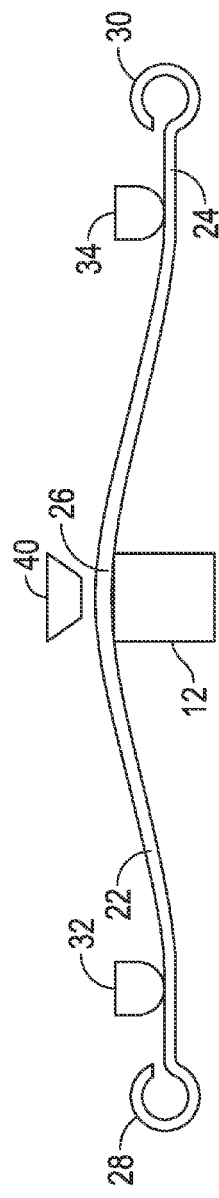

LEAF SPRING ASSEMBLY

TECHNICAL FIELD

This disclosure relates to leaf springs and leaf spring assemblies, such as those used in vehicular suspensions.

BACKGROUND

Leaf springs and leaf spring assemblies, also called Hotchkiss suspensions, refer to beams or laminations of beams used as springs. An axle, or other unsprung component, is suspended from the leaf spring. The bending of the leaves provides a cushioning effect.

SUMMARY

A leaf spring assembly is provided. The leaf spring assembly includes a leaf having a first end and a second end on opposing sides of a center point. The leaf spring assembly is characterized by the absence of any additional leaves beyond the leaf The leaf spring assembly also includes a first bumper and a second bumper spaced from the first bumper. The first bumper contacts the leaf upon, or after traveling through, a first displacement of the leaf spring assembly. The second bumper also contacts the leaf upon the first displacement of the leaf spring assembly.

The above features and advantages, and other features and advantages of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 1 is a schematic isometric view of a leaf spring assembly for a vehicle, shown in a free position;

FIG. 2 is a schematic isometric view of the leaf spring assembly, shown in an engaged position;

FIG. 3 is a schematic side view of a mono leaf for the leaf spring assembly of FIG. 1 shown in a laden position; and FIG. 4 is a schematic side view of the mono leaf in a jounced position.

DETAILED DESCRIPTION

Referring to the drawings, like reference numbers correspond to like or similar components wherever possible throughout the several figures. In FIG. 1 and FIG. 2, there are shown schematic views of a leaf spring assembly 10. FIG. 1 illustrates the leaf spring assembly 10 at a free position, in which the leaf spring assembly 10 is minimally loaded, and FIG. 2 illustrates the leaf spring assembly 10 at an engaged position, in which the leaf spring assembly 10 is loaded and has displaced relative to the free position shown in FIG. 1.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

The leaf spring assembly 10 may be only a portion of the suspension system for a vehicle (not shown) and is operatively attached to an axle assembly 12, which is shown only schematically and may represent components including a half-shaft or a knuckle. The leaf spring assembly 10 connects or suspends the axle assembly 12 relative to vehicle attachment points 14, which may represent portions of a frame, a chassis, or components connected thereto, such as bushings.

The portion of the vehicle supported by the leaf spring assembly 10 may be referred to as a corner on passenger or smaller cargo vehicles. The leaf spring assembly 10 may connect the vehicle attachment points 14 to either driven, such as the rear wheels of a rear-wheel drive vehicle, or non-driven, such as the rear wheels of a front-wheel drive vehicle.

The leaf spring assembly 10 may be illustrated in FIG. 1 with the vehicle at curb weight. Note that the exact flexure or state of the leaf spring assembly 10 shown in the figures is illustrative only. The curb weight generally includes the total weight of the vehicle with standard equipment, all necessary operating consumables (such as motor oil and coolant), and a full tank of fuel, but not loaded with cargo. Alternatively, the state of the leaf spring assembly 10 shown in FIG. 1 may be referred to as the free position, a neutral state, or a first loading condition. Note that some definitions of curb weight vary, and that some include a predetermined driver mass and some include a constant amount of fuel, as opposed to a full tank.

The leaf spring assembly 10 may be illustrated in FIG. 2 with the vehicle under increased loading, relative to FIG. 1, such as a second loading condition. In FIG. 2, the leaf spring assembly 10 has traveled a first distance relative to the vehicle attachment points 14 and relative to the first loading condition shown in FIG. 1.

As shown in FIGS. 1-2, the leaf spring assembly 10 includes a leaf or mono leaf 20, which is the only suspension leaf, such that there are no additional primary leaves and no secondary leaves. The leaf spring assembly 10 may include additional suspension components, such as dampers and bushings, but does not include any leaves in addition to the mono leaf 20.

The mono leaf 20 has a forward end 22 and a rearward end 24, which are on opposing sides of a center point 26. Note that designation as forward or rearward is illustrative of only one configuration or installation of the leaf spring assembly 10 and the mono leaf 20. The forward end 22 may also be referred to as a first end and the rearward end 24 may also be referred to as a second end, or vice versa. Any other references to forward and rearward are also illustrative and other forward or rearward components may be designated as first, second, et cetera.

The forward end 22 of the leaf spring assembly 10 may be oriented toward the direction of typical travel of the vehicle (i.e., the front of the vehicle, toward the left in the figures) with the leaf spring assembly 10 having a substantially longitudinal configuration. However, the orientation of the leaf spring assembly 10 may also be reversed, such that the rearward end 24 faces the direction of travel. Furthermore, the leaf spring assembly 10 may have a substantially tangential orientation, such that the leaf spring assembly 10 is oriented perpendicularly to the direction of travel.

A forward eyelet 28 is formed at the forward end 22 of the mono leaf 20, and a rearward eyelet 30 is formed at the rearward end 24 of the mono leaf 20. The forward eyelet 28 and the rearward eyelet 30 may be attached to bushings, which allow rotation and displacement of the forward eyelet 28 and the rearward eyelet 30 relative to the vehicle attachment points 14. In the configuration illustrated in the figures, the leaf spring assembly 10 includes a shackle 31, which is disposed between the rearward eyelet 30 and the vehicle attachment points 14.

The leaf spring assembly 10 also includes a forward bumper 32 and a rearward bumper 34, which is spaced apart from the forward bumper 32. The forward bumper 32 contacts the mono leaf 20 at a first displacement of the leaf spring assembly 10. Similarly, the rearward bumper 34 contacts the mono leaf 20 at the first displacement of the leaf spring assembly 10. Travel or displacement of the leaf spring assembly 10 may refer to relative displacement between the axle assembly 12 and the vehicle attachment points 14 or between the center point 26 of the mono leaf 20 and the vehicle attachment points 14.

In the leaf spring assembly 10, the forward bumper 32 and the rearward bumper 34 are formed from, or include, compliant elements. The forward bumper 32 and the rearward bumper 34 may be formed from, for example and without limitation: HDPE, rubber. Therefore, the mono leaf 20 compresses the compliant portions of the forward bumper 32 and the rearward bumper 34 as the leaf spring assembly 10 travels between the first displacement (shown in FIG. 2) and a second displacement (shown in FIG. 3).

Alternatively, the forward bumper 32 and the rearward bumper 34 may be formed of semi-compliant or semi-solid elements with minimal compliance other than a slight cushioning effect. In some configurations, the forward bumper 32 and the rearward bumper 34 may be almost solid, but would likely have sufficient compliance to damp out noise created during engagement and to provide some wear protection for the composite material of the mono leaf 20.

Referring also to FIG. 3, and with continued reference to FIGS. 1-2, there is shown another view of the leaf spring assembly 10. In FIG. 3, the leaf spring assembly 10 is illustrated under a third loading condition, which is additional loading beyond that illustrated in FIGS. 1 and 2.

In FIG. 3, the mono leaf 20 has come into contact with the forward bumper 32 at a forward offset 36 spaced inward from the forward eyelet 28. Similarly, the mono leaf 20 has come into contact with the rearward bumper 34 at a rearward offset 38 spaced inward from the rearward eyelet 30. The forward offset 36 and the rearward offset 38 may be defined as the distance between a reference point, such as the centers of the forward eyelet 28 and the rearward eyelet 30, and the point of contact between the mono leaf 20 and the forward bumper 32 and the rearward bumper 34. Between the forward offset 36 and the rearward offset 38 is a secondary span 39.

Generally, displacement of the leaf spring assembly 10 occurs as a result of loading between the road and the vehicle. For example adding cargo increases the loads applied to the vehicle attachment points 14 and causes displacement of the leaf spring assembly 10. Similarly, an impact from the road introduces loads applied the axle assembly 12 and also causes displacement of the leaf spring assembly 10.

Each of the figures illustrates a different loading condition, with progressively increasing loading. FIG. 1 shows the first loading condition, which may be the free state or curb weight. The leaf spring assembly 10 may be defined as having zero travel or displacement at the free state. Furthermore, there is no contact with the forward bumper 32 and the rearward bumper 34.

Under the loads shown in FIG. 1, the leaf spring assembly 10 has a first spring rate, which is a low spring rate relative to the other conditions shown. In FIG. 1, the spring rate of the leaf spring assembly 10 is a result of the entire length or span of the mono leaf 20.

FIG. 2 shows a second loading condition, which has caused the leaf spring assembly 10 to travel over a first displacement. After traveling the first displacement, the mono leaf 20 makes contact with forward bumper 32 and the rearward bumper 34. The mono leaf 20 begins to compress the forward bumper 32 and the rearward bumper 34, which provides additional resistance to movement and increases the spring rate. In FIG. 2, the leaf spring assembly 10 may be considered to have a second spring rate, which is a transition spring rate and is greater than the first spring rate.

FIG. 3 shows a third loading condition, which caused the leaf spring assembly 10 to travel a second displacement. The third loading condition may be referred to as a fully-loaded state or a gross vehicle weight. As a result of the third loading condition, the forward bumper 32 and the rearward bumper 34 are fully engaged and will not compress further. Therefore, the leaf spring assembly 10 has a third spring rate, which is a high rate, relative to the other conditions shown, and is greater than the first spring rate and the second spring rate.

After the forward bumper 32 and the rearward bumper 34 have fully engaged, the spring rate of the leaf spring assembly 10 is controlled by only the secondary span 39 of the mono leaf 20, which is shorter than the entire mono leaf 20. The transition spring rate provided by the forward bumper 32 and the rearward bumper 34 may improve feel as the leaf spring assembly 10 moves between the low spring rate provided by the entire mono leaf 20 (as illustrated in FIG. 1) to the high spring rate provided by the secondary span 39 (as illustrated in FIG. 3).

Although not shown, a fourth loading condition occurs as the leaf spring assembly 10 experiences maximum travel or displacement. At the fourth loading condition, the mono leaf 20 contacts a final jounce stop 40, which may compress slightly but then becomes rigid. The final jounce stop 40 limits further travel of the spring assembly, such that substantially no additional travel occurs.

Therefore, as the leaf spring assembly 10 experiences travel or displacement it provides increasing spring rates. The first spring rate is experienced up to the first displacement, the second spring rate is experienced between the first displacement and the second displacement (as the forward bumper 32 and the rearward bumper 34 compress), and the third spring rate is experienced beyond the third displacement up to contact with the final jounce stop 40, if included.

Note that the relative amounts of flexure or travel of the mono leaf 20 shown in FIGS. 1-3 is illustrative only. For example, the mono leaf 20 is shown substantially flat in FIG. 3 as a result of the third loading condition, which causes forward bumper 32 and the rearward bumper 34 to fully engage. However, in actual implementation on the vehicle, the mono leaf 20 may still be curved downward, as shown in FIGS. 1 and 2, or may be curved upward (closer to final jounce stop 40) under these conditions.

As best viewed in FIG. 3, in the leaf spring assembly 10 illustrated in the figures, the forward offset 36 and the rearward offset 38 are different lengths. More particularly, the forward offset 36 is greater than the rearward offset 38. Note that because the forward offset 36 is greater than the rearward offset 38, the secondary span 39 is shifted rearward. Therefore, the center of the secondary span 39 is behind the center point 26 of the mono leaf 20, which causes the highest stress concentrations to occur behind the center point 26 and behind the axle assembly 12.

Changing the length of the secondary span 39, the length of the mono leaf 20 (which may be measured between the centers of the forward eyelet 28 and the rearward eyelet 30), or the stiffness of the mono leaf 20 varies the first spring ratio and the third spring ratio. The length of the forward offset 36 and the rearward offset 38 may be expressed as ratios of the mono leaf 20. The ratios are illustrative only, but provide a scalable relationship for leaf spring assemblies 10 used in both small (light) and large (heavy) vehicles.

In the illustrative leaf spring assembly 10 of FIG. 3, the forward offset 36 is approximately twenty-nine percent of the distance between the forward eyelet 28 and the center point 26. However, in other configurations, the ratio of the forward offset 36 may be between twenty to forty percent.

In the illustrative leaf spring assembly 10 of FIG. 3, the rearward offset 38 is approximately twenty-three percent of the distance between the rearward eyelet 30 and the center point 26. However, in other configurations, the ratio of the rearward offset 38 may be between ten to thirty-five percent. Therefore, the secondary span 39 shown is approximately seventy-four percent of the total length of the mono leaf 20 between the forward eyelet 28 and the rearward eyelet 30.

As best viewed in FIG. 3, the mono leaf 20 of the leaf spring assembly 10 also has different thickness across its length. The mono leaf 20 has a first thickness 42 at, or near, the center point 26 of the mono leaf 20, and has a second thickness 44 at least one of, or both, the forward end 22 and the rearward end 24. In the configuration shown, the first thickness 42 is greater than the second thickness 44, such that the mono leaf 20 generally tapers from the outward.

The taper effect may be continuous, such that there are no non-tapered portions, or the mono leaf 20 may include flat portions. In the configuration shown in FIGS. 1-3, the mono leaf 20 has a central flat 46 and at least one distal flat 48. A tapered span 50 connects or runs between the central flat 46 and each of the distal flats 48. The tapered spans 50 may occupy between fifty to seventy-five percent of the length between the center point 26 and either the forward eye 28 or the rearward eye 30.

The tapered spans 50 shown have a substantially linear transition between the first thickness 42 and the second thickness 44. Furthermore, note that one side (the upper side, as viewed in FIG. 3) of the mono leaf 20 is substantially planar. Alternatively, the tapered spans 50 may have a parabolic, as opposed to linear, shape.

The mono leaf 20 shown is symmetric left-to-right, such that the forward eyelet 28 in to the center point 26 is substantially identical to the rearward eyelet 30 inward to the center point 26. Therefore, the mono leaf 20 may be installed in either direction. Note that the forward offset 36 and the rearward offset 38 define the secondary span 39 regardless of the location of the central flat 46, the distal flats 48, or the tapered spans 50.

In other configurations, the mono leaf 20 may be asymmetric. For example, the center point 26 could be shifted toward either the forward eyelet 28 or the rearward eyelet 30. Similarly, the tapered spans 50 may not be equal length.

In the symmetric mono leaf 20, the highest stress concentrations are shifted rearward of the axle assembly because the secondary span 39 is shifted rearward by location of the forward bumper 32 and the rearward bumper 34. However, altering the mono leaf 20 to be asymmetric may achieve a similar result, such as by changing the length of the tapered spans 50.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A leaf spring assembly for suspending an axle assembly, comprising:
    a mono leaf having a first end and a second end on opposing sides of a center point, wherein the leaf spring assembly is characterized by the absence of any additional leaves;
    a first bumper, wherein the first bumper contracts the mono leaf upon a first displacement of the leaf spring assembly; and
    a second bumper spaced from the fist bumper, wherein the second bumper contacts the mono leaf upon the first displacement of the leaf spring assembly;
    a first eyelet formed at the first end of the mono leaf, wherein the first bumper contacts the mono leaf at a first offset spaced inward from the first eyelet;
    a second eyelet formed at the second end of the mono leaf, wherein the second bumper contacts the mono leaf at a second offset spaced inward from the second eyelet;
    wherein the first end is a forward end and the second end is a rearward end; and
    wherein the first offset is greater than the second offset.

2. The leaf spring assembly of claim 1,
    wherein the first bumper and the second bumper include compliant elements and the mono leaf compresses the compliant elements as the leaf spring assembly travels between the first displacement and a second displacement.

3. The leaf spring assembly of claim 2, wherein the first offset and the second offset are different lengths.

4. The leaf spring assembly of claim 3, wherein the mono leaf has:
    a first thickness at the center point of the mono leaf; and
    a second thickness at one of the forward end and the rearward end of the mono leaf, wherein the first thickness is greater than the second thickness.

5. The leaf spring assembly of claim 4, further comprising:
    a final jounce stop, wherein the final jounce stop contacts the mono leaf upon a third displacement and limits further travel of the spring assembly.

6. The leaf spring assembly of claim 5, wherein the mono leaf has a substantially linear transition between the first thickness and the second thickness.

7. A leaf spring assembly for suspending an axle assembly, comprising:
    a mono leaf having a first end and a second end on opposing sides of a center point, wherein the leaf spring assembly is characterized by the absence of any additional leaves, and the mono leaf has:
        a first thickness at the center point of the mono leaf; and
        a second thickness at one of the first end and the second end of the mono leaf, wherein the first thickness is greater than the second thickness;
    a frame, wherein the axle assembly is suspended relative to the frame;
    a first bumper attached to the frame and having a first compliant element, wherein the first bumper contacts the mono leaf upon a first displacement of the leaf spring assembly and the first compliant element compresses between the first displacement and a second displacement of the leaf spring assembly; and
    a second bumper attached to the frame and having a second compliant element and spaced from the first bumper, wherein the second bumper contacts the mono leaf upon the first displacement of the leaf spring assembly and the second compliant element compresses between the first displacement and the second displacement of the leaf spring assembly.

8. The leaf spring assembly of claim 7, wherein the mono leaf has a first spring rate during travel up to the first displacement and a second spring rate, greater than the first spring rate, during travel beyond the first displacement.

9. The leaf spring assembly of claim 8,
wherein the first bumper contacts the mono leaf at a first offset, which is located between twenty to forty percent of the distance between the center point and the first end of the mono leaf; and
wherein the second bumper contacts the mono leaf at a second offset, which is located between ten to thirty-five percent of the distance between the center point and the second end of the mono leaf.

10. A leaf spring assembly for suspending an axle assembly, comprising:
a mono leaf having a first end and a second end on opposing sides of a center point;
a first bumper, wherein the first bumper contacts the mono leaf upon a first displacement of the leaf spring assembly;
a second bumper spaced from the first bumper, wherein the second bumper contacts the mono leaf upon the first displacement of the leaf spring assembly, wherein the first bumper and the second bumper include complaint elements and the mono leaf compresses the complaint elements as the leaf spring assembly travels between the first displacement and a second displacement; and
a final jounce stop, wherein the final jounce stop contacts the mono leaf upon a third displacement and limits further travel of the spring assembly.

11. The leaf spring assembly of clam 10, wherein the mono leaf has:
a first thickness at the center point of the mono leaf; and
a second thickness at one of the forward end and the rearward end of the mono leaf, wherein the first thickness is greater than the second thickness.

12. The leaf spring assembly of claim 11, wherein the mono leaf has a substantially linear transition between the first thickness and the second thickness.

13. The leaf spring assembly of claim 10,
a first eyelet formed at the first end of the mono leaf, wherein the first bumper contacts the mono leaf at a first offset spaced inward from the first eyelet;
a second eyelet formed at the second end of the mono leaf, wherein the4 second bumper contacts the mono leaf at a second offset spaced inward from the second eyelet.

14. The leaf spring assembly of claim 13, wherein the first offset and the second offset are different lengths.

* * * * *